Feb. 16, 1943. W. H. DE LANCEY 2,311,031
CHANGE SPEED GEARING
Filed Dec. 8, 1941 6 Sheets-Sheet 2

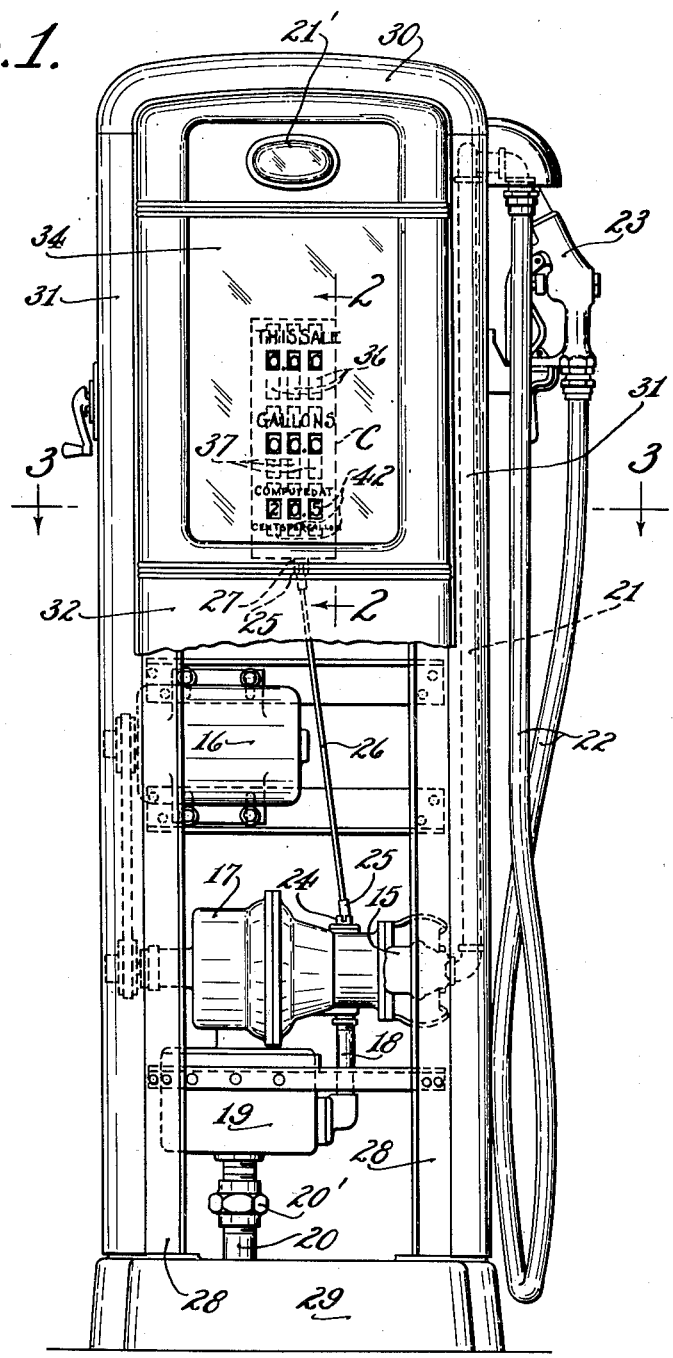

INVENTOR
WARREN H. DeLANCEY
BY
Chapin & Neal
ATTORNEYS

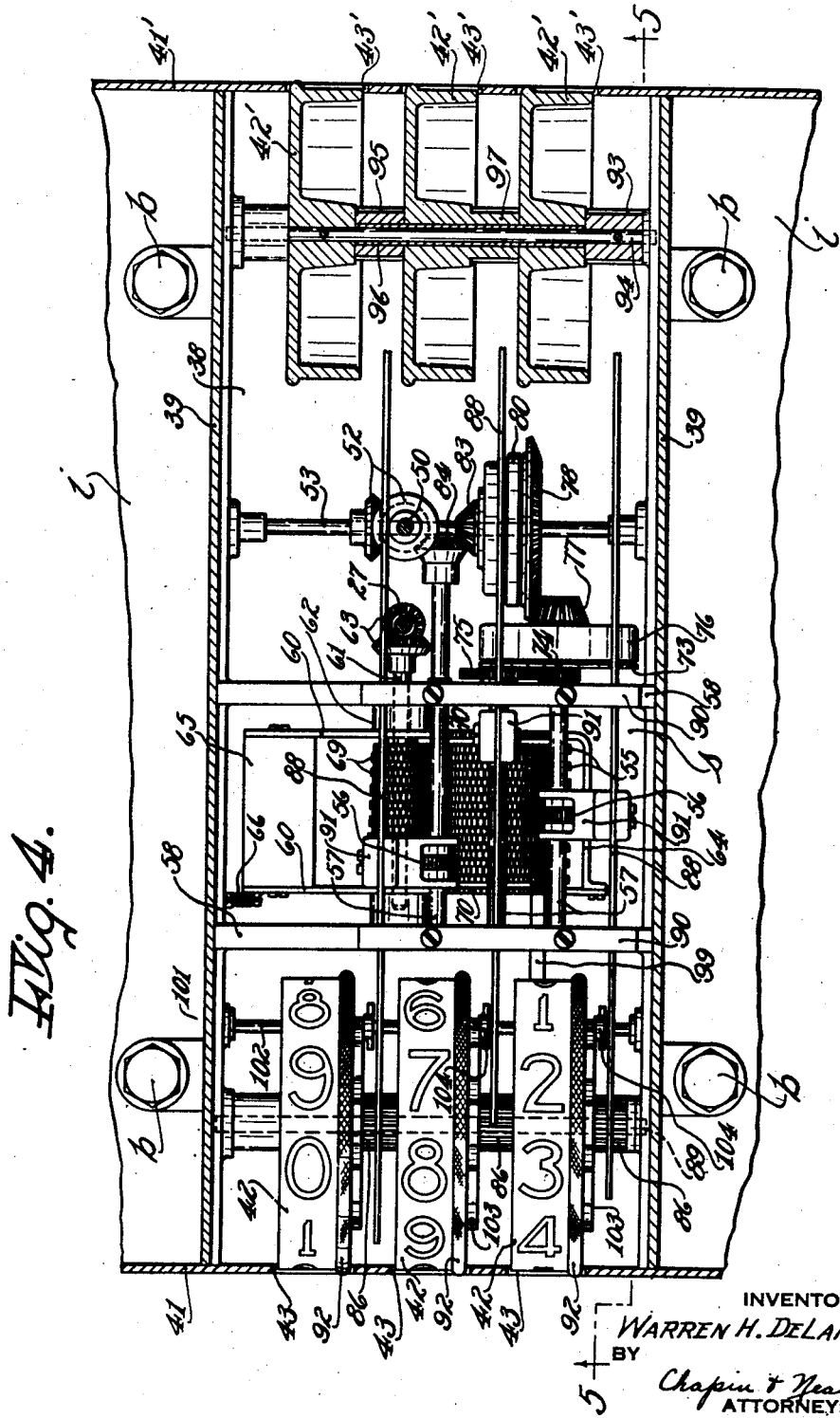

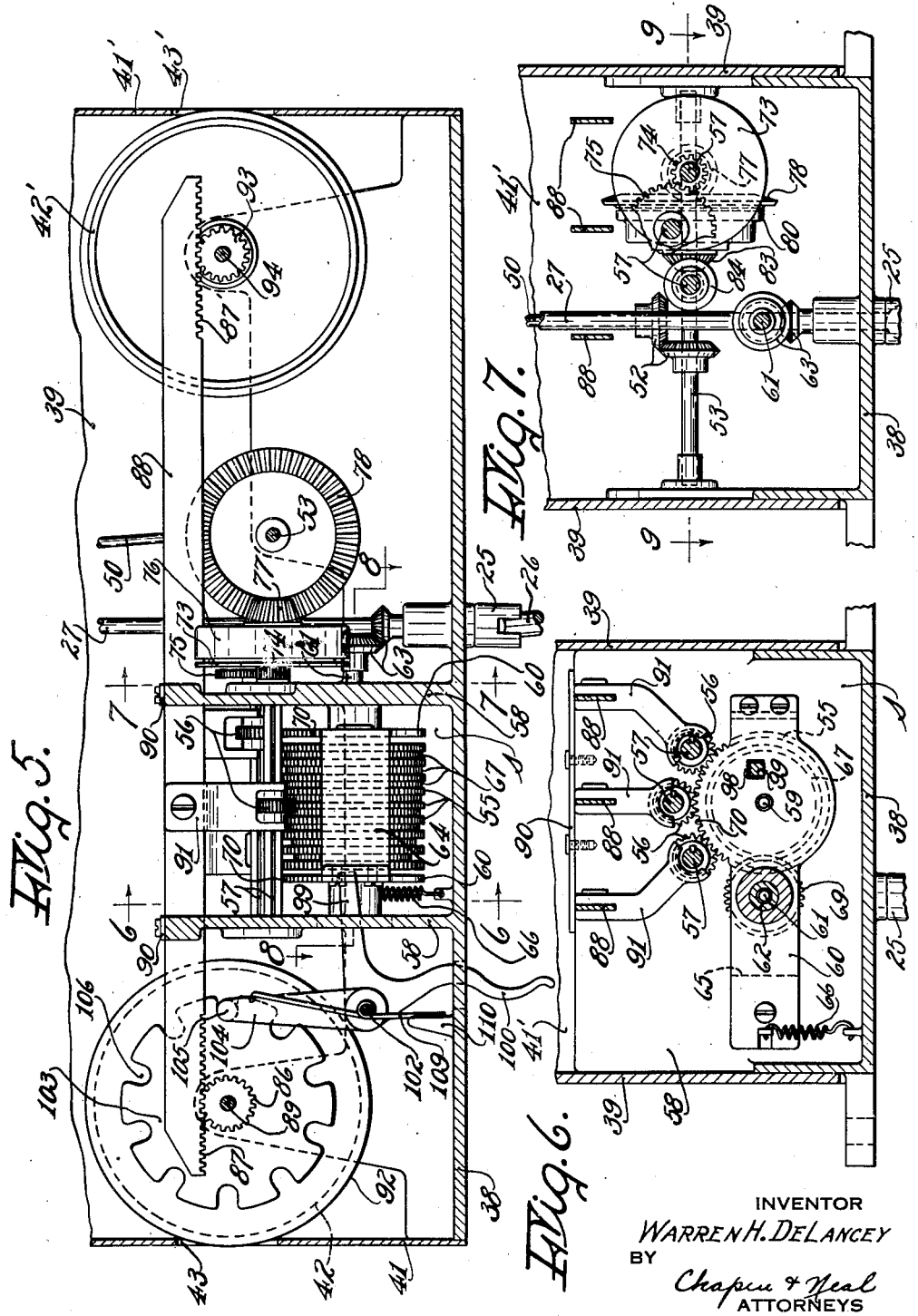

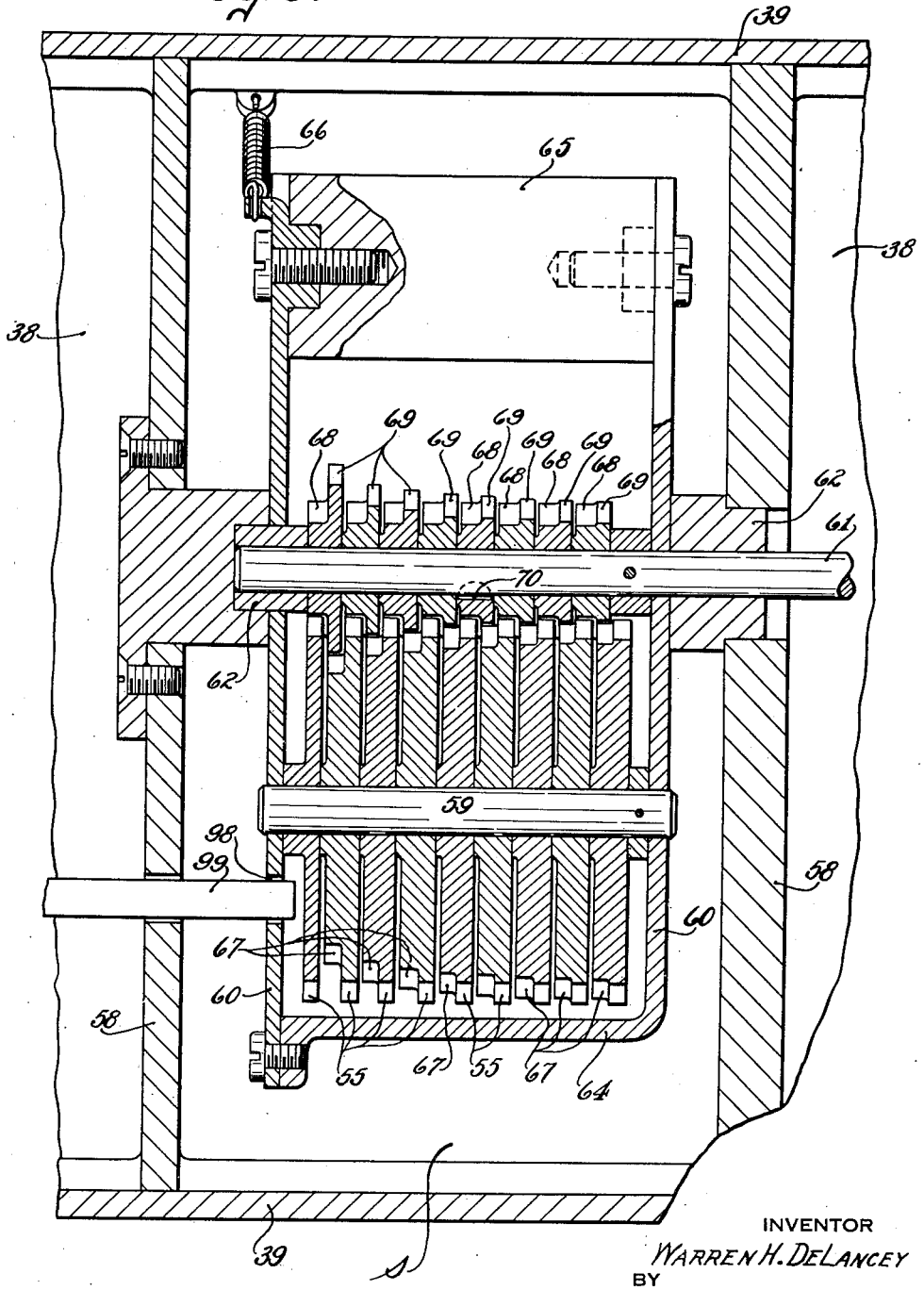

Feb. 16, 1943. W. H. DE LANCEY 2,311,031
CHANGE SPEED GEARING
Filed Dec. 8, 1941 6 Sheets—Sheet 6

INVENTOR
WARREN H. DE LANCEY
BY
Chapin & Neal
ATTORNEYS

Patented Feb. 16, 1943

2,311,031

UNITED STATES PATENT OFFICE 2,311,031

CHANGE SPEED GEARING

Warren H. De Lancey, Springfield, Mass., assignor to Gilbert & Barker Manufacturing Company, West Springfield, Mass., a corporation of Massachusetts Application December 8, 1941, Serial No. 422,031

13 Claims. (Cl. 74—283)

This invention relates particularly to a gasoline dispensing pump. Of course it is adapted to dispense other liquids. However, its main purpose is to dispense gasoline or liquid sold at automobile filling stations. In operation it pumps the liquid, measures the quantity, and computes the cost, all in one automatic operation as a machine.

Prior art gasoline pumps are available and are commercially used to perform these broad functions. They can be worked by hand power but are usually power-driven. Many of such prior art pumps are patented. For example, the Jauch et al. Patent No. 1,888,533 discloses one. The Slye Patent No. 2,111,996 is another one specific to the cost computing mechanism. The Mayo Patent No. 2,212,241 is another one specific to particular structure and the way of setting the computing mechanism at any desired one of a variety of prices and posting the price for the public to see at what current price the mechanism is set. There are other patents also, but the ones mentioned are enough to indicate the prior patented art. Today's commercial practice at most filling stations is being carried on under the licensed monopoly of these prior patents.

According to one purpose of my invention, I provide new structure, as herein disclosed, to pump the liquid, measure the quantity, and compute the cost at the price posted for public view at the pump. This new structure differs from the prior art. One difference is in the structural means by which said results are accomplished. Such means do not embody the inventions of the prior patents. Another difference is in the useful way my new structure is arranged and operates as compared to the prior art. By this I mean that my invention is conceived and disclosed, not as a technical improvement subject to the subsisting patents of others, but as an independent way of making and operating a gasoline dispensing and computing pump.

According to another purpose and as will be clear from my disclosure, the present invention is adapted to practical use with a self-measuring pump in association with the other desirable elements of dispensing apparatus arranged to operate together without the need of a liquid meter per se for accurately delivering measured quantities of the dispensed liquid. And I disclose the invention particularly arranged for this use.

The invention will best be understood from the disclosure of the accompanying drawings and description.

In the drawings,

Fig. 1 is a front elevational view, with parts broken away to reveal interior construction, of a computing-type gasoline dispensing pump in which the invention is embodied;

Fig. 2 is a fragmentary sectional elevational view taken on the line 2—2 of Fig. 1 and showing the registering mechanism;

Fig. 3 is a fragmentary sectional plan view taken on the line 3—3 of Fig. 1, showing how the door of the pump casing opens to enable access to the setting means for the speed-variating mechanism;

Fig. 4 is a sectional plan view taken on the line 4—4 of Fig. 2, showing the speed variating mechanism and the means for setting the same;

Fig. 5 is a sectional elevational view taken on the line 5—5 of Fig. 4;

Figure 9:
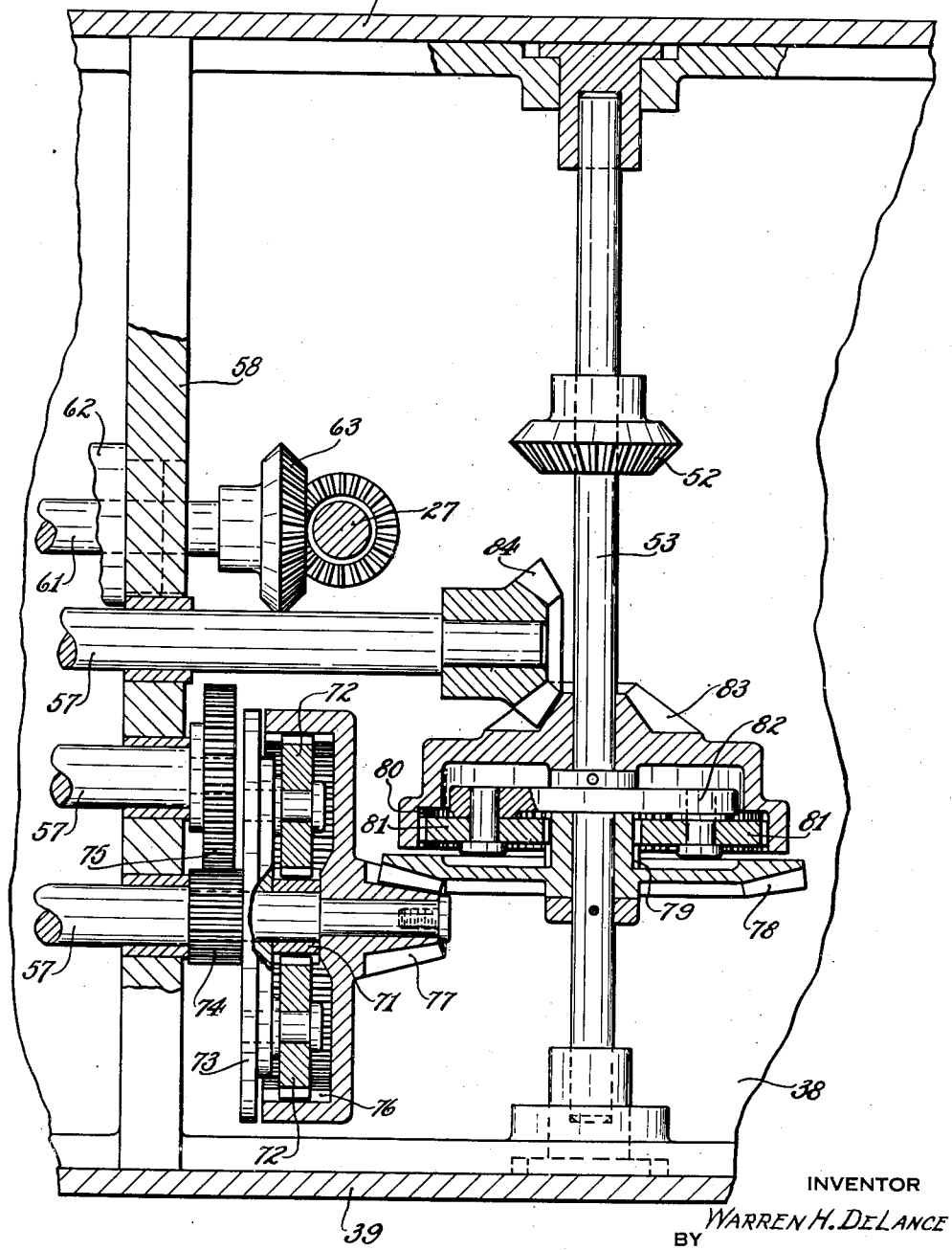

Figs. 6 and 7 are cross-sectional views taken on the lines 6—6 and 7—7, respectively, of Fig. 5;

Fig. 8 is an enlarged sectional plan view taken on the line 8—8 of Fig. 5 and showing the speed variator; and Fig. 9 is an enlarged view taken on the line 9—9 of Fig. 7 showing the differentials and other gearing interposed between the speed variator and the driving shaft for the cost number wheels of the register.

Referring now to the drawings, the invention has been illustrated in connection with a self-measuring type of gasoline pump. Such pumps are old and well known in the art and are characterized in that a predetermined degree of actuation results in the delivery of a unit quantity of liquid, provided of course that the pump and its suction and dispensing line are fully primed.

Referring to the drawings, Fig. 1, there is indicated the base 29, the frame 28, the side panels 31, one of the oppositely arranged doors 32 and the top 30 of a pump pedestal or casing. The windows 34 have a flow indicator device at the top, and the indicators to be further described show through the window as represented. The dispensing hose and nozzle are shown in the customary way. It is customary to start the motor after the nozzle is removed from its hook. And it is customary to require a stopping of the motor before the nozzle can again rest idly on the hook. I have not shown the means to do this.

The apparatus in the casing is connected by a pipe union 20' to suction pipe 20 coming up from the liquid storage tank. Parts 19 and 17 indicate accessories for the pump 15. I plan for my commercial dispensing apparatus to use a liquid pump and accessories operating according to the general principles fully disclosed in one form by my copending application Serial No. 347,288, filed July 24, 1940. I do not wish to burden the description herein with all its details. But I will mention enough to indicate its general character.

The pump 15 per se is a self-measuring pump. If it is primed by being filled with liquid, substantially free of air, the amount of the pump's mechanical movement is an accurate indication of the volume of liquid which is delivered at its outlet. It is a piston pump. The movement of the pump drives a shaft 24. This, by a universal joint 25, drives shaft 26. The latter drives the mechanism at the top of the casing.

The pump accessories indicated are chamber 19, the casing 17 connected with the chamber at the top and containing a hydraulic clutch and priming pump not shown. One part of the clutch is driven by motor 16. If sufficient liquid is in casing 17, the hydraulic clutch operates to drive the pump 15 whenever the motor is driven. To get sufficient liquid in casing 17 a priming pump in the casing operates from the driving shaft of the clutch. Thus, on starting the motor, if casing 17 is not supplied with liquid, its clutch will not engage and operate pump 15. But the priming pump will operate to fill the casing and, after that is done, the pump 15 will operate. The priming pump, as usual with such a device, operates to vent the air and draw liquid. The liquid is drawn merely to prime casing 17. Thus, the action puts a hydraulic head above chamber 19. The pump inlet is connected by pipe 18 to the bottom of chamber 19. It is understood that the latter will be primed whenever and a little before casing 17 is primed, and the pump 15 cannot operate at all to draw liquid until 17 is primed to cause its hydraulic clutch to engage for pump driving operation. All these pump details are more fully disclosed and shown in my said copending application except the parts as indicated herein have some differences of relative position to better fit the pedestal frame. While the self-measuring pump referred to is preferred, other specific types may be suitably arranged for my purpose. The important feature of arrangement is this: Where the mechanism at the top of the casing is driven by the movement of a self-measuring pump, a piston pump being one type, it is important to have the pump primed with liquid. If for any reason such pump is not primed but is nevertheless operated, it will not then operate as a self-measuring pump for liquid.

I am not the first to arrange a self-measuring pump with a separate priming pump to insure its correct operation in liquid dispensing apparatus. Such an arrangement generally is seen in the Lanser prior Patent 1,528,253 of 1925. In my arrangement the same general plan of using the dispensing pump element per se as a feasible self-measuring pump is followed in my power-driven dispensing apparatus. In this way my self-measuring dispensing pump element will not pump air or gas. So, only liquid is measured.

The pump 15 of Fig. 1 forces liquid out through a discharge line, including the pipe 21, connected through to the flow indicator 21', the dispensing hose 22, and a valved hose nozzle 23, all in the usual and well known way so far as the discharge line is concerned, except that the discharge line contains no liquid meter element as customarily used. The pump drives the shaft 24 which, by universal joints 25 and a shaft 26, drives the shaft 27 of a registering mechanism of any suitable form. In this particular case, the pump, in dispensing one gallon, will turn shafts 24, 26, and 27 eight revolutions.

No meter is involved in the dispensing apparatus above described. One reason I elect to use the self-measuring pump without the meter is to put my apparatus and its invention outside the combination of structure pointed out rather broadly in the prior and litigated Jauch patent mentioned above. I desire my apparatus as a whole to be independent of prior patents.

The motor, pump, and associated elements are suitably supported, as seen in Fig. 1, by a frame, including four angle irons 28, upstanding from a base 29 and capped by a dome 30. The space between the base and dome is enclosed by a casing comprising two end panels 31 and front and rear panels 32 and 33, respectively. The front and rear panels have windows 34, through which the indications of the registering mechanism are seen. The front panel 32 is connected to one angle iron 28 by hinges 35 (Fig. 3) so that it may readily be swung open to gain access to the means for setting the speed variating mechanism, as will later be described.

The registering mechanism (Fig. 2) usually includes front and rear sets of number wheels 36 and 36' to indicate cost, and front and rear number wheels 37 and 37' to indicate quantity of the liquid dispensed. Such mechanism is mounted in a box-like casing C located near the top of the pump casing, as shown in Fig. 1. Cacing C (Fig. 2) is secured by bolts b to a support t, which in turn is fixed to the angle iron frame 28, above described. This casing includes a base 38 and, fixed thereto, a pair of upstanding sides 39 and a top 40 fixed to the sides. Dial plates 41 and 41' are secured, as indicated, to form the front and rear panels of the casing C. Below the lower sets of number wheels 37 and 37' are front and rear sets of number wheels 42 and 42' which show the price per unit quantity. The dial plates 41 and 41' have suitable openings 43 and 43', respectively, through which the indications of the cost number wheels, the quantity number wheels, and the unit price indicator wheels are visible.

As shown in Fig. 2, the front and rear number wheels 37 and 37' are interconnected by a train of gears 44. The middle gear of the train is carried by a shaft 45, driven by gearing 46 from the vertical shaft 27, which extends through the base 38 and is connected, as above described, to be driven from the mechanical operation of the self-measuring pump. The driving ratio between shafts 27 and 45 is 8 to 1. The front and rear number wheels 36 and 36' are similarly interconnected by a train of gears 47 and the middle one is carried by a shaft 48 which is driven by spiral gears 49 from a shaft 50 at a one to one ratio. The shaft 50 is mounted in a bearing member 51 supported as indicated from one of the side plates 39. Shaft 50 is connected by bevel gears 52 to a horizontal shaft 53. Shaft 27 is the driving shaft and shaft 53 the driven shaft of the speed changing transmission mechanism to be described.

This speed variating mechanism or speed changing transmission gearing is located in its entirety within the casing C. The speed variator is made small enough to be readily mounted on the base 38 in the space marked s between the front and rear indicator wheels 42 and 42' which, as will appear, serve as a means for indicating in terms of money what speed ratio is established at any time by the setting mechanism of the speed changing transmission.

Referring first to Figs. 4 and 5, the speed variator includes a set of coaxially arranged gears 55, all of the same size,—that is, having the same pitch diameter. The set will usually include nine such gears, as shown, and each is driven at a different speed. The variator also includes a plurality (three as shown in Fig. 6) of pinions 56 which are each selectively engageable with any of said gears. Since the gears are all of the same diameter, the pinions may be shifted from one gear to another in a straight line path. To this end each pinion is slidably but non-rotatably engaged with a splined shaft 57. Each such shaft is mounted near each end in bearings which are fixed in two parallel upstanding webs 58 formed on the above described base 38. To facilitate shifting of the pinions from one gear to another, the gears 55 are mounted to move bodily as one unit in a substantially radial direction. Referring now to Fig. 8, which is drawn to double scale, all these gears are mounted for independent rotation on a single shaft 59. This shaft is supported at its ends in two side plates 60 of a rocking frame. The pivot for this frame is a shaft 61, which is mounted near its ends in bearings 62, fixed one to each of said webs 58. Shaft 61 (Figs. 4 and 5) is driven by bevel gears 63 from the driving shaft 27. The frame also includes an end plate 64 for tying together the side plates 60 at one end and a counterweight 65 which serves to tie these side plates together at the other end. A spring 66 acts to move the frame so as to lift the gears 55 into mesh with the pinions 56. This arrangement will be clear from Fig. 6.

The gears 55 are driven at different speeds from the driving shaft 27 as set forth below. Referring to Fig. 8, each gear except the first one of the series (the one at the extreme left of Fig. 8) has fixed thereto (as by the integral connection shown) a smaller gear 67. Each gear 55 and its integral gear 67 is free to turn on shaft 59. The pivot shaft 61 carries a set of eight pinions 68, each of the same pitch diameter, which in this case is one-third the pitch diameter of gears 55. These pinions 68 mesh one with each of the gears 55 except the ninth one of the set—the ninth one being at the right-hand end seen in Fig. 8. Each pinion 68 has attached thereto, as by the integral connection shown, a larger pinion 69. These pinions 69 mesh one with each of the gears 67. Each pinion 68 and its attached pinion 69 are free to turn on shaft 61, except for the fifth pinion of the set, which is fixed to shaft 61 by the key 70 shown. Thus, the fifth pinion 68 directly drives the fifth gear 55; the gear 67 of the fifth gear 55 drives the fourth pinion 69; and the pinion 68 attached to the latter drives the fourth gear 55; the gear 67 on the fourth gear 55 drives the third pinion 69; and the pinion 68 on the latter drives the third gear 55; and so on down to the first gear 55 of the set. The fifth pinion 69 drives the gear 67 which is attached to the sixth gear 55 and the latter drives the sixth pinion 68; the sixth pinion 69 drives the gear 67 fixed to the seventh gear 55 and so forth up to the ninth gear 55. The arrangement is such that the second gear 55 moves at twice the speed of the first gear 55; the third gear 55 moves at three times the speed of the first gear 55; the fourth gear 55 moves at four times the speed of the first gear 55; and so forth up to the ninth gear 55, which moves at nine times the speed of the first gear 55. Assuming for example that the speed of the shaft 61 is five revolutions per gallon, the speeds of the gears 55 are, counting from left to right in Fig. 8, 1/3, 2/3, 1, 1 1/3, 1 2/3, 2, 2 1/3, 2 2/3, and 3 revolutions per gallon.

Each of the shiftable pinions 56 is in this case of the same pitch diameter as the pinions 68—that is, one-third the pitch diameter of gears 55. Hence, each shiftable pinion 56, when engaged respectively with the first, second, third, fourth, fifth, sixth, seventh, eighth, and ninth gears 55, will turn at the speeds of one, two, three, four, five, six, seven, eight, and nine revolutions per gallon. To hold any shiftable pinion 56 against rotation, when required, gear segments 70 are provided, one on each side plate 60, with either of which any pinion 56 may be engaged when desired (see Figs. 4, 5, and 6).

As one concrete example, the following table gives the sizes of gears and pinions which will effect the results above described:

*Pitch diameter in inches*

|  | No. 1 | No. 2 | No. 3 | No. 4 | No. 5 | No. 6 | No. 7 | No. 8 | No. 9 |
|---|---|---|---|---|---|---|---|---|---|
| Pinions 69 | .8 | .66666 | .61562 | .58832 | .5717 | .560 | .55172 | .5456 |  |
| Gears 67 |  | 1.2 | 1.333 | 1.3842 | 1.4112 | 1.428 | 1.44 | 1.44828 | 1.4544 |

Pinions 68—all .5 inch pitch diameter
Gears 55—all 1.5 inches pitch diameter
Pinions 56—all .5 inch pitch diameter.
Gear segments 70—all 1.5 inches pitch diameter The teeth of the gears and pinions of the speed variating mechanism are preferably formed with a relatively high pressure angle (substantially 30 degrees, for example) to give them a contour that will enable them, and particularly of course the gears 55 and pinions 68, to easily go into mesh.

The movements of the three shafts 57 are transmitted through two differentials to the driven shaft 53. The uppermost and lowermost shafts 57 in Figs. 4 and 9 will be called the inner and outer shafts, respectively, and the other shaft 57 will be called the intermediate. The full movement of the inner shaft 57 is transmitted to shaft 53. However, only one-tenth of the movement of the intermediate shaft 57 is transmitted to the driven shaft and only one one-hundredth of the movement of the outer shaft 57 is transmitted to such shaft. That is, the effect of these shafts on the driven shaft is as follows: One revolution of the inner shaft 57 will produce one revolution of the driven shaft 53; one revolution of the intermediate shaft 57 will move the driven shaft 36 degrees; and one revolution of the outer shaft 57 will move the driven shaft 3.6 degrees. Thus, since each shaft 57 is capable of being driven at nine different speeds and also of being held stationary, the arrangement provides 999 possible speed changes in the transmission between the driving and driven shafts.

The differential gearing is best shown in Fig. 9. The outer shaft 57 has fixed thereto the sun gear 71 of the first differential. The planet gears 72 are rotatably mounted on an arm 73 which in turn is rotatably mounted on the outer shaft. Arm 73 has fixed thereto a pinion 74 which is driven by a gear 75, fixed on the intermediate shaft, at twice the speed of such shaft. An internal gear 76, having four times the number of teeth as the sun gear 71, is mounted to turn freely on the outer shaft 57 and is in mesh with the planet gears 72. The internal gear 76 has fixed thereto a bevel pinion 77 which drives a bevel gear 78 at one-fifth its speed. Bevel gear 78 is mounted to turn freely on the driven shaft 53 and has fixed thereto the sun gear 79 of a second differential. An internal gear 80, having four times the number of teeth as the sun gear 79, is rotatably mounted on the driven shaft 53. Planet gears 81 mesh with the sun gear 79 and the internal gear 80. These planet gears 81 are rotatably mounted on an arm 82 which is fixed to the driven shaft 53. The internal gear 80 has fixed thereto a bevel gear 83 which is driven by a bevel gear 84 fixed on the inner shaft 57. The ratio between the gears 84 and 83 is 5 to 4.

The following table, taken from a standard handbook on the subject of differentials, will enable one to determine the amount of turning movement imparted to the driven shaft 53 by the several shafts 57.

| Stationary | Driving | Driven | Revolution of A | Revolution of R |
|---|---|---|---|---|
| A | S | R | Zero | $\frac{S}{R}$ |
| S | A | R | One | $\frac{R+S}{R}$ |
| R | S | A | $\frac{S}{R+S}$ | Zero |
| S | R | A | $\frac{R}{R+S}$ | One |

In this table, A designates the arm, such as 73 or 82, which carries the planet gears, such as 72 or 81; S the size of the sun gear, such as 71 or 79, and R the size of the internal gear, such as 76 or 80. In this case, the ratio between the number of teeth on each sun gear and its internal gear is 1 to 4 so that S may be considered as 1 and R as 4 for both differentials.

To determine the driving ratio between the outer shaft 57 and the driven shaft 53, assume that the intermediate and inner shafts 57 are held stationary. The arm 73 will thus be stationary; the sun gear 71 will be driving and the internal gear 76 will be driven. The first line of the above table indicates the conditions which apply and the speed of the internal gear 76 will be S/R or ¼. Thus, one revolution of outer shaft 57 will produce a ninety-degree movement of gear 76. This movement is reduced by one-fifth or to 18 degrees, by the bevel gears 77 and 78. In the second differential, the sun gear 79 will be driving, the arm 82 will be driven and the internal gear 80 will be stationary. The third line of the above table shows the conditions which apply and the movement of arm 82 will be $$\frac{S}{R+S}$$

or ⅕. Thus, the described 18° movement of the sun gear will be reduced by one-fifth or down to 3.6 degrees when transmitted to arm 82 and shaft 53. The driving ratio between outer shaft 57 and shaft 53 is thus 100 to 1.

To determine the driving ratio between the intermediate shaft 57 and the driven shaft 53, assume that the outer and inner shafts 57 are held stationary. The gears 75 and 74 are in 2 to 1 ratio so that one revolution of the intermediate shaft 57 produces 720 degrees movement of the arm 73. The arm 73 is driving, the sun gear 71 is stationary, and the internal gear 76 is driven. The second line of the table shows the conditions which apply. Thus, the turning movement of the internal gear 76 is $$\frac{R+S}{R}$$

or 5/4×720°, or 900°. The ratio between the internal gear 76 and the arm 82 of the second differential, as determined in the preceding paragraph is 1/25 and 1/25 of 900° equals 36°. Thus, the ratio between the intermediate shaft 57 and shaft 53 is 10 to 1.

To determine the ratio between the inner shaft 57 and the driven shaft 53, assume that the outer and intermediate shafts 57 are stationary. One revolution of the inner shaft 57 will result in 5/4×360° or 450° movement of the internal gear 80. The latter gear will be driving; the sun gear 79 will be stationary and the arm 82 will be driven. The conditions which apply are shown in the fourth line of the table and the amount of turning movement of the arm 82 and thus of the driven shaft 53 will be $$\frac{R}{R+S}$$

or ⅘ of 450 degrees, or 360 degrees. Thus, the ratio between the inner shaft 57 and shaft 53 is 1 to 1.

The described arrangement of gearing is such that the several movements transmitted by the several shafts 57 to the driven shaft 53 are added. That is, the outer shaft 57 and the intermediate shaft 57 both operate to drive the internal gear 76 in the same direction and the sun gear 79 and the inner shaft 57 both operate to drive the driven shaft 53 in the same direction.

In the specific case shown in the drawings (see Fig. 4), the pinion 56 of the inner shaft 57 engages the second gear 55 of the set, and thus the inner shaft 57 would make two revolutions per gallon of gasoline dispensed. The pinion 56 of the intermediate shaft 57 engages one of the gear segments 70 and thus is held stationary. The pinion 56 on the outer shaft 57 engages the fifth gear 55 of the set and thus makes five revolutions per gallon of liquid dispensed. The illustrated setting of the pinion 56 corresponds to a unit price of 20.5 cents per gallon. The summing up of the motion of shafts 57 by the differentials results in 2.05 revolutions per gallon of the driven shaft 53. This shaft actuates the number wheel 36 of lowest order,—the "cents" wheel of the cost register, at a ratio of one to one. Thus, the "cents" number wheel will be turned 2.05 revolutions and the "cents" wheel will turn the "tens" number wheel two-tenths of a revolution, thus registering two on the "tens" wheel while the "cents" wheel will be turned half way between zero and one,—the register thus showing 20½ cents, which is the proper cost of one gallon.

The shiftable pinions 56 of the speed variating mechanism are moved along their splined shafts 57 in a straight line path parallel to the axis of the gears 55 by the means best shown in Figs.

4 and 5. Each price indicator wheel 42 has fixed thereto a pinion 86 which meshes with rack teeth 87 formed on a bar 88. The several wheels are rotatably mounted on a shaft 89, supported in bearings formed on base 38. Each bar 88 is slidably mounted in grooves, formed one in each of the two upstanding webs 58, and is held in place in such grooves by gibs 90. Each bar has fixed thereto a member 91, having two forks which straddle the splined shaft 57, one on each side of the pinion 56. By turning the price indicator wheels 42, the pinions 56 will be shifted along their shafts 57. Each such wheel can readily be turned by reaching in through the opening 43 in the dial plate 41 after the door 32 of the pump casing has been opened, as will be clear from Fig. 3. Each wheel 42 may, if desired, have a knurled bead 92 to facilitate manual rotation of it in the manner described. The fractions wheel 42, when operated, shifts the pinion 56 on the outer shaft 57; the units wheel 42 shifts the pinion 56 on the intermediate shaft 57; and the tens wheel 42 shifts the pinion 56 on the inner shaft 57. These three wheels 42 together, being mounted side by side on one and the same axis or shaft 89, give a readily readable indication of the unit price, as will be clear from Fig. 1. As there shown, they display the figure "20.5"—being the unit price for which the speed variator is set, as above described.

It will be clear that price indicator wheels 42' of the rear set will have to be reversed from those of the first set in order to read properly when one faces them. That is, the "tens" wheel 42' (Fig. 4) will be opposite the fractions wheel 42, and the fractions wheel 42' will be opposite the "tens" wheel 42. The rack bars 88, however, are straight and they are arranged in parallel relation. The rack bar 88, which is driven by the fractions wheel 42, is also in mesh with a pinion 93 (Figs. 4 and 5) which is adjacent the "tens" wheel 42', but it is not attached thereto. Rather, this pinion is fixed to the shaft 94 which supports all the wheels of the rear set and the "fractions" wheel 42' is fixed to this shaft. The rack bar 88 which is driven by the "tens" wheel 42 is also in mesh with a pinion 95 (Fig. 4) which lies adjacent the fractions wheel 42' but it is not attached thereto. Instead, the pinion is fixed to a sleeve 96, rotatably mounted on the shaft 94, and the "tens" wheel 42' is fixed to this sleeve. The units wheel 42' is rotatably mounted on sleeve 96 and has fixed thereto a pinion 97, which is in mesh with the teeth of the same rack bar 88 that is driven by the pinion 86 on the units wheel 42 of the front set.

It is desirable to disengage the gears 55 from the pinions 56 prior to shifting of the pinions by the price indicator wheels 42 or 42' in the manner described. To this end, the gears 55 are mounted in the rocking frame heretofore described. Such frame has an opening 98 therein (Figs. 6 and 8) in which the outer end of an arm 99 of a bell crank is engaged. This bell crank is fixed to a shaft 102, which is mounted at its ends one in each of the bracket bearings which support shaft 89. This bell crank has a depending arm 100 which extends downwardly through an opening in base 38 into a position where it is conveniently accessible for manual operation, as will be clear from Fig. 5. Each indicator wheel 42 of the front set has fixed thereto a disk 103 having a plurality of notches 106 in its periphery, one notch for each number on the wheel. Upstanding arms 104 are fixed on shaft 102, one adjacent each disk. Each arm 104 is provided at its upper end with a roll o cylindrical part 105 to enter any one of the notches of disk 103 and prevent it from turning. A spring 109, having a turn-around shaft 102 near its mid-portion, engages at its upper end with one arm 104 and at its lower end with a lug 110 on base 38. The spring 109 holds the part 105 of its arm 104 engaged in a notch 106 of disk 103. Thus, each number wheel may be positively held in any of the various positions of adjustment which the number wheel may assume. When the roll 105 is engaged in any of the notches 106, the number wheel is so positioned that some one of the numbers on its number wheel is centralized in one of the window openings 43. The use of the arms 104 to lock the number wheels compels the operator to unmesh the gear set, comprising the gears 55, from the shiftable gears 56 before any number wheel can be turned to shift any of the selective gears 56. When the door 32 of the pump casing is opened, the operator has access both to the number wheels 42 and to the bell crank arm 100. By reaching beneath the dial plate 41 with one hand, he can grasp arm 100 and pull it forwardly. This will unmesh gears 55 and 56 and move all the arms 104 so that their parts 105 are drawn out from the notches 106 in disks 103, thereby unlocking all the number wheels 42. Then, while continuing to hold arm 100 in the described position with one hand, the operator can then with the other hand turn the necessary wheel or wheels 42 to set the selective gears 56 into the desired positions. When this has been done, he releases his hold on arm 100 and the gears 55 are moved back into mesh with pinions 56.

In operation, the motor-driven, self-measuring pump 15 forces through the dispensing line a predetermined amount of gasoline during each revolution—in this instance one-eighth of a gallon. The pump, through shafts 24, 26, and 27, the gearing 46 and gearing 44, drives the number wheels 43 and 43' of lowest order, at one revolution for each eight revolutions of the pump. Thus, the quantity dispensed is correctly shown by the number wheels 37 and 37' through the middle set of openings 43 and 43'. The way in which the lowest order number wheel operates the next highest order number wheel, and so on, is so well known that I do not describe it. These counters may be of the well known kind indicated.

The operator adjusts the variator to give the necessary speed ratio between shaft 27 and the number wheels 36 and 36' of lowest order of the cost register or counter. This may be done very simply and conveniently. The operator opens the door 34 of the pump casing, as indicated by dotted lines in Fig. 3, pulls forward on arm 100 to disengage gears 55 from pinions 56, and then manually turns the several number wheels 42 until together they display through their window openings 43 the unit price of gasoline which prevails for that day. When this is done, the variator has been correctly set to give the right speed ratio between the gallons and cost portions of the register. And the setting of the variator may be made very quickly and conveniently. One simply turns the wheels 42 by hand, moving them as by the knurled rims 92, which are accessible through the openings 43 as will be clear from Figs. 3 and 4. The work may be done in a moment. The wheels 42, while locked in their several positions of adjustment by the arms 104 and disks 103, are unlocked by the act of unmeshing the gears 55 from pinions 56, so that they may be manually turned. The setting of wheels 42 also correspondingly sets the number wheels 42' through the rack bars 88, as above explained. The grouping of the price indicator wheels in side-by-side relation on one and the same supporting shaft, allows these wheels to be brought closely together so that their several indications appear virtually as one, as will be clear from Fig. 1. One sees the price "20.5" cents per gallon rather than the three component figures which make up such price.

As above explained in detail, the turning of the fractions wheel 42 to "5" moves the pinion 56 along the outer shaft 57 until it meshes with the fifth gear 55; the turning of the "units" wheel 42 moves the pinion 56 along the intermediate shaft until it meshes with one or the other of the gear segments 70 on the rocking frame which supports the gears 55 of the variator; and the turning of the "tens" wheel 42 moves the pinion 56 along the inner shaft 57 until it registers with the second gear 55.

As above explained, the inner shaft 57 will turn at two revolutions per gallon, the intermediate shaft 57 will be held stationary, and the outer shaft 57 will be driven at five revolutions per gallon. The movements of these shafts are so transmitted to the driven shaft 53 that the latter moves at the rate of 2.05 revolutions to the gallon. That is, the inner shaft 57 will turn shaft 53 at the same speed; the intermediate shaft 57 will turn shaft 53 at one-tenth its speed; and the outer shaft 57 will turn shaft 53 at one one-hundredth of its speed. Thus, the two revolutions per gallon of inner shaft 57 and the five one-hundredths revolution per gallon of the outer shaft add up to 2.05 gallons per revolution of shaft 53. Shaft 53 drives the lowest order number wheels 36 and 36' of the cost portion of the register at a one-to-one ratio, whereby such wheels are turned two complete revolutions and one-twentieth of a revolution more. The lowest order number wheels 36 and 36' turn the adjacent number of next highest order by the usual or any suitable transfer mechanism two-tenths of a revolution. Thus, when one gallon has been dispensed, the number wheels 36 and 36' will display through their respective openings 43 and 43' a cost of between twenty and twenty-one cents.

The structure disclosed and its mode of operation will accomplish my aforementioned purposes.

What I claim in this disclosure as my invention in carrying out these purposes is now pointed out.

I claim:

1. A speed changing gear transmission, adapted to determine the speed ratio between the two driving shafts of two counter mechanisms and having in combination the two driving shafts, a plurality of gears all of the same size mounted side by side on a common axis, means for driving all of said gears from one of said shafts but at different speeds, a plurality of pinions each selectively engageable with said gears, means for moving each pinion in a straight line path parallel to said axis to effect the selective engagement, means for bodily moving said gears in a substantially radial path of constant extent to unmesh the pinions from the selected gears at the start of the selective movement of said pinions and to remesh the pinions with other selected gears at the end of such movement, and connections between each pinion and the other of said shafts.

2. A speed changing gear transmission, adapted to determine the speed ratio between the two driving shafts of two counter mechanisms and having in combination the two driving shafts, a frame, a shaft supported thereby, a plurality of gears all of the same number of teeth mounted on said last-named shaft for independent rotation, connections between said gears and one of said driving shafts for driving all of said gears at different speeds, said means including a shaft passing through said frame and supported outside said frame and acting as a pivot therefor, a plurality of pinions each selectively engageable with said gears, shafts one for each pinion, each said pinion having a slidable but non-rotatable engagement with its shaft and being slidably movable along the shaft from one gear to another, each of the last-named shafts being supported outside the frame and having its axis parallel with that of said gears, means for moving said frame on its pivot shaft to mesh and unmesh said gears and pinions, means to move said pinions on their shafts to engage them with selected gears, and connections between each of the last-named shafts and the other of said driving shafts.

3. A speed changing gear transmission, adapted to determine the speed ratio between the two driving shafts of two counter mechanisms and having in combination the two driving shafts, three separately shiftable gears and a gear set to cooperate for driving said gears at selected speeds which together control the final driving ratio between said shafts, said gear set being mounted for bodily movement into and out of mesh with said shiftable gears, the axis for the gear set and the axes for said shiftable gears being all parallel and the latter axes being closely spaced on a short arc with the axis of the gear set as a center, splined countershafts one for each of the shiftable gears and each fixed in position except for rotation with its gear whereby the gear set may be put in and be taken out of mesh with the shiftable gears at the same time by bodily moving the gear set, an indicating device for each shiftable gear to show its position on its shaft, the three indicating devices being operable by the movements of the three shiftable gears to show the ratio of the transmission determined at any time by the positions of the three shiftable gears, the structure thus arranged making it impossible to have any one of the shiftable gears out of functioning position when the others are functioning to determine the speed ratio between said driving shafts and thus insuring the correctness of the indicator devices in expressing the ratio between said shafts.

4. A speed changing gear transmission, adapted to determine the speed ratio between the two driving shafts of two counter mechanisms and having in combination the two driving shafts, a frame, a first shaft driven by one of said driving shafts and on which said frame is pivoted, a second shaft mounted to move bodily with said frame, a set comprising a plurality of first gears all having the same number of teeth and mounted on the second shaft for independent rotation, second gears fixed one to each except the first of said set of gears and each having a different number of teeth, pinions all of the same number of teeth and mounted on the first shaft and meshing one with each except the last of said set of first gears, a pinion fixed to each first-named pinion and meshing one with each of the second gears, whereby all the gears and pinions are interconnected so that rotation of any one will rotate all the others, one of the first-named pinions being fixed to said first shaft, a plurality of pinions each selectively engageable with any of the first gears, shafts one for each last-named pinion and with which the pinion is slidably but non-rotatably engaged, means for moving each last-named pinion along its shaft to engage it with a selected gear, means for moving said frame on said first shaft to mesh and unmesh said last-named pinions and first-named gears, and connections between the several last-named pinion shafts and the other of said driving shafts for adding up the movements of said last-named pinion shafts.

5. A speed changing gear transmission, adapted to determine the speed ratio between the two driving shafts of two counter mechanisms and having in combination the two driving shafts, a plurality of coaxially arranged gears driven at different speeds by one of said shafts, a plurality of gears each selectively engageable with said first-named gears, a shaft for each of said selective gears on which such gear is non-rotatably but slidably engaged, different ratio gear means interposed between said selective gear shafts and the other of said driving shafts, means whereby each of said selective gears may be propelled on its shaft into any selected operative position, said means including a plurality of manually rotatable indicator wheels one for each said selective gear, and connections between each wheel and its selective gear for slidably moving the latter as the wheel is turned, said wheels being mounted side by side on one and the same axis so that together they provide a readily readable indication in correspondence with the ratio of rotation between said driving shafts.

6. A speed changing gear transmission, adapted to determine the speed ratio between the two driving shafts of two counter mechanisms and having in combination the two driving shafts, a plurality of coaxially arranged sets of gear teeth driven at different speeds by one of said driving shafts, a plurality of gears selectively engageable with said sets of gear teeth, a shaft for each of said selective gears on which such gear is non-rotatably but slidably engaged, different ratio gear means interposed between said selective gear shafts and the other of said driving shafts, means whereby each of said selective gears may be propelled on its shaft into any selected operative position, and means for bodily shifting said sets of gear teeth in a substantially radial direction to unmesh them from and remesh them with the selective gears near the start and near the end respectively of the movement of a selective gear from one set of gear teeth to another.

7. A speed changing gear transmission, adapted to determine the speed ratio between the two driving shafts of two counter mechanisms and having in combination the two driving shafts, a plurality of gears driven by one of said driving shafts, a common shaft supporting said gears, a frame having side members one supporting each end of said last-named shaft and mounted to move in a substantially radial direction with respect to said gears, a gear segment fixed to one of said members and coaxially of said gears, a plurality of gears each selectively engageable with any of the first-named gears or with said segment, a plurality of shafts one for each selective gear supported outside and independently of said frame, each selective gear being axialy slidable on its selective shaft but non-rotatably engaged therewith, different ratio gear means interposed between each selective gear shaft and the other of said driving shafts, means whereby each selective gear may be shifted along its shaft into any engagement with any of the first-named gears or with said segment, and means for moving said frame to respectively unmesh and remesh the first-named gears or segment from or with the selective gears near the start and end of the shifting movement of any selective gear.

8. A speed changing gear transmission, adapted to determine the speed ratio between the two driving shafts of two counter mechanisms and having in combination the two driving shafts, a plurality of gears all of the same size mounted side by side on a common axis, means for driving all of said gears from one of said shafts but at different speeds, a plurality of pinions each selectively engageable with said gears, means for moving each pinion in a straight line path parallel to said axis to effect the selective engagement, said pinions and said gears being relatively movable in a substantially radial path to move them out of mesh and subsequently into mesh at the start and at the end of the selective movement of each pinion, means compelling the unmeshing of all said pinions from the selected gears with which they are in mesh prior to selective movement of any pinion in said straight line path, and connections between each pinion and the other of said shafts.

9. A speed changing gear transmission, adapted to determine the speed ratio between the two driving shafts of two counter mechanisms and having in combination the two driving shafts, a plurality of gears all of the same size mounted side by side on a common axis, means for driving all of said gears from one of said shafts but at different speeds, a plurality of pinions each selectively engageable with said gears, means for moving each pinion in a straight line path parallel to said axis to effect the selective engagement, means for bodily moving said gears in a substantially radial path of constant extent to unmesh the pinions from the selected gears at the start of the selective movement of said pinions and to remesh the pinions with other selected gears at the end of such movement, means compelling unmeshing of said gears and pinions prior to movement of any pinion in said straight line path, and connections between each pinion and the other of said shafts.

10. A speed changing gear transmission, adapted to determine the speed ratio between the two driving shafts of two counter mechanisms and having in combination the two driving shafts, a plurality of gears all of the same size mounted side by side on a common axis, means for driving all of said gears from one of said shafts but at different speeds, a plurality of pinions each selectively engageable with said gears, means for moving each pinion in a straight line path parallel to said axis to effect the selective engagement, means for bodily moving said gears in a substantially radial path of constant extent to unmesh the pinions from the selected gears at the start of the selective movement of said pinions and to remesh the pinions with other selected gears at the end of such movement, locking means for said pinion-moving means releasable by movement of the gear-moving means into position to unmesh said gears and pinions, and connections between each pinion and the other of said shafts.

11. A speed changing gear transmission, adapted to determine the speed ratio between the two driving shafts of two counter mechanisms and having in combination the two driving shafts, a plurality of gears all of the same size mounted side by side on a common axis, means for driving all of said gears from one of said shafts but at different speeds, a plurality of pinions each selectively engageable with said gears, individual means for moving each pinion in a straight line path parallel to said axis to effect the selective engagement, individual manually-rotatable number wheels one for each last-named means for actuating the same, a disk movable with each wheel and having a circular series of openings therein one for each number on its wheel, locking members one for each disk and normally engaged in one of the openings in its disk to hold the attached number wheel in any one of its various positions of adjustment, a member connected to bodily move said gears in a substantially radial path to mesh and unmesh them with said pinions, connections between said last-named member and said locking members whereby all the clocking members are withdrawn from said openings to release the number wheels when said gears and pinions are unmeshed and moved back into said openings to lock said number wheels against movement when said gears and pinions are remeshed, and connections between said pinions and the other of said shafts.

12. A speed changing gear transmission, adapted to determine the speed ratio between the two driving shafts of two counter mechanisms and having in combination the two driving shafts, a plurality of coaxially arranged sets of gear teeth driven by one of said driving shafts, three pinions each selectively engageable with said sets of gear teeth, a set of three shafts consisting of outer, intermediate and inner shafts, there being one such shaft for each pinion and on which said pinion is slidably but non-rotatably engaged, said set of shafts being mounted in closely-spaced parallel relation with the axes of the outer and inner shafts of the set lying in the same plane as the axis of the other driving shaft and at right angles thereto, a first differential including a sun gear fixed on said outer shaft, planet gears meshing with the sun gear, a carrier for said planet gears rotatably mounted on said outer shaft and having a spur gear fixed thereto, a spur gear on said intermediate shaft engaging the last-named gear, an internal gear rotatably mounted on said outer shaft and in mesh with the planet gears and having fixed thereto a bevel pinion, a second differential having a bevel gear meshing with said bevel pinion and carrying a sun gear mounted to turn freely on the second-named driving shaft, planet gears meshing with the second sun gear, a carrier for the second planet gears fixed to the second-named driving shaft, an internal gear meshing with the second planet gears and rotatably mounted on the second-named driving shaft, said last-named internal gear having a bevel gear fixed thereto, and a bevel gear fixed on said inner shaft and meshing with the last-named bevel gear.

13. A speed changing gear transmission, adapted to determine the speed ratio between the two driving shafts of two counter mechanisms and having in combination the two driving shafts, a plurality of coaxially arranged sets of gear teeth driven by one of said driving shafts, a plurality of pinions each selectively engageable with said sets of gear teeth, a plurality of parallel shafts disposed at right angles to the other of said driving shafts, there being one such shaft for each pinion and on which such pinion is slidably but non-rotatively engaged, a first differential including a sun gear fixed on the first of said pinion shafts, planet gears meshing with the sun gear, a carrier for the planet gears rotatably mounted on the first pinion shaft and gear connected to the second pinion shaft, an internal gear rotatably mounted on the first pinion shaft and in mesh with said planet gears, a second differential having a sun gear mounted to rotate on said second-named driving shaft, gear connections between the second sun gear and the internal gear, planet gears meshing with the second sun gear, a carrier for the second planet gears fixed to said second-named driving shaft, an internal gear rotatably mounted on the second-named driving shaft and meshing with the second planet gears, and gear connections between the third pinion shaft and the second internal gear.

WARREN H. DE LANCEY.